J. M. LAUCK.
STEAM-CARRIAGE.
No. 183,177. Patented Oct. 10, 1876.
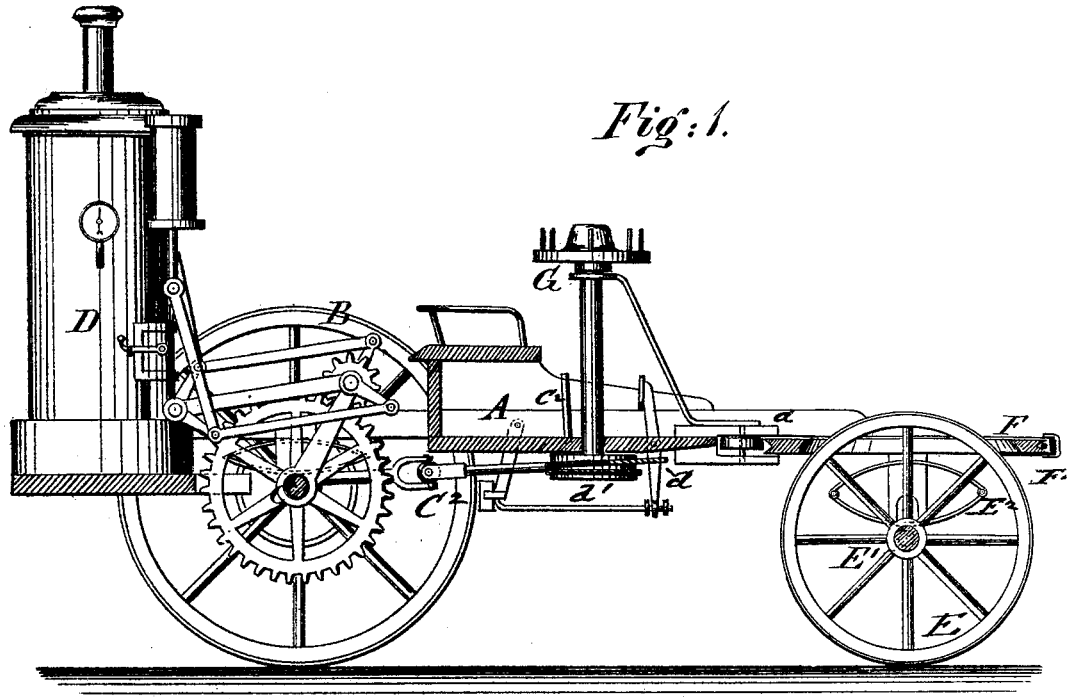
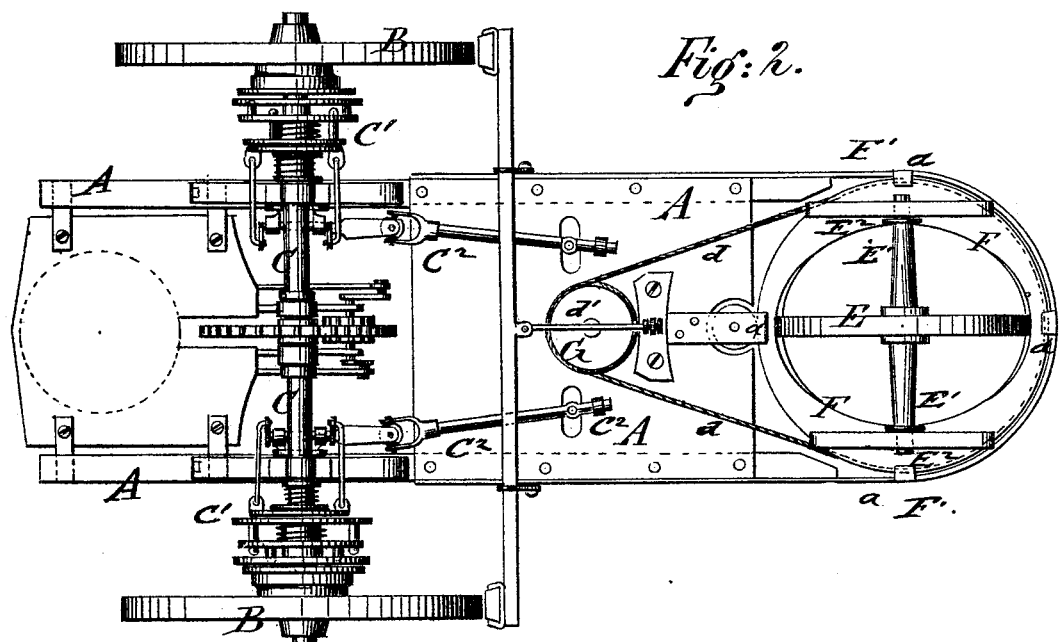
WITNESSES:
Chas. Nida
John Goethals
INVENTOR:
Jacob M. Lauck
BY
ATTORNEYS.
JAMES R. OSGOOD & CO. BOSTON.

UNITED STATES PATENT OFFICE.

JACOB M. LAUCK, OF WEST MILFORD, WEST VIRGINIA.

IMPROVEMENT IN STEAM-CARRIAGES.

Specification forming part of Letters Patent No. 183,177, dated October 10, 1876; application filed May 16, 1876.

*To all whom it may concern:*

Be it known that I, JACOB M. LAUCK, of West Milford, in the county of Harrison and in the State of West Virginia, have invented a new and Improved Steam-Carriage, of which the following is a specification:

In the accompanying drawing, Figure 1 represents a sectional side elevation of my improved steam-carriage, and Fig. 2 a bottom view of the same.

Similar letters of reference indicate corresponding parts.

My invention relates to an improved steam-carriage that is readily steered and conducted around curves; and the invention consists of a carriage driven by a steam or other motor, and provided with hind wheels that may, by means of a clutch mechanism, be made to revolve independently of the driving-shaft. The carriage is steered by a front guide-wheel, whose axle is secured by a horizontal turn-table or disk operated by pulley-and-belt connection and a steering-wheel.

In the drawing, A represents the supporting-frame of my improved carriage; B, the hind wheels, and C the hind axle, of the same. The hind axle C is revolved by a suitable steam or other motor, D, that is secured to the supporting-platform back of the hind axle, and connected by gear-wheels, chain and pulleys, or other transmitting mechanism to the hind axle. The hind wheels B are placed loosely on the axle C, and secured rigidly thereto by clutch mechanisms $C^1$, that are forced by suitable springs into hub-plates of the wheels. The clutch mechanism $C^1$ of each wheel may be readily withdrawn by a lever and swivel-connection, $C^2$, operated by levers arranged near the driver's seat. On turning ordinary curves in roads the clutch mechanism is arranged to allow the outer wheel to make a greater number of revolutions than the inner one. On turning very short curves, by withdrawing the clutch from the inner wheel all the power is thrown on the outer wheel, and thereby the carriage allowed to turn easily on a space a little larger than its own length. The guide-wheel E at the front part of frame A is connected, by its axle $E^1$, supports, and springs $E^2$, with a horizontal turn-table or disk, F, that swings in a guide-frame, F', with steadying-lugs $a$. The turn-table F has a circumferential groove, and is connected by a belt, cord, or chain, $d$, with a pulley, $d'$, at the lower end of an upright shaft and steering-wheel, G, in front of the driver's seat. The hind wheels are further provided with suitable brakes, worked by a treadle.

The carriage may be propelled at considerable speed, steered with facility, and carried readily around curves.

Having thus described my invention, what I claim as new, and desire to secure by Letters Patent, is—

1. A vehicle having a seat near the middle, with a hand-lever in front thereof, by which one or both wheels may be thrown out of gear with axle, and a hand-wheel, G, for operating the guide-wheel, as set forth.

2. The combination, in vehicle A B C, of the spring-clutches $C^1$ and hand mechanism $C^2$, arranged as and for the purpose described.

3. The combination, with vehicle A B C, of the steering device G, pulley $d'$, belt $d$, rotary disk F, springs $E^2$, axle $E^1$, and guide-wheel E, arranged as and for the purpose specified.

J. M. LAUCK.

Witnesses:
M. MAXWELL,
THOS. F. PRITCHARD.